Aug. 11, 1936.  F. L. LEON  2,050,757
COUPLING
Filed March 7, 1935
FIG_1_
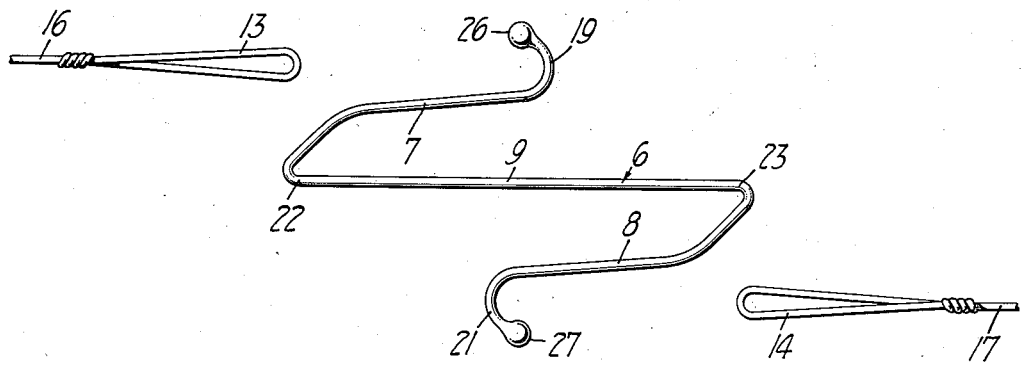
FIG_2_
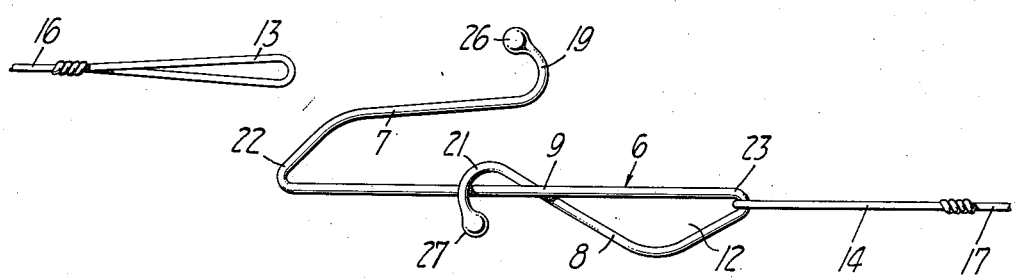
FIG_3_
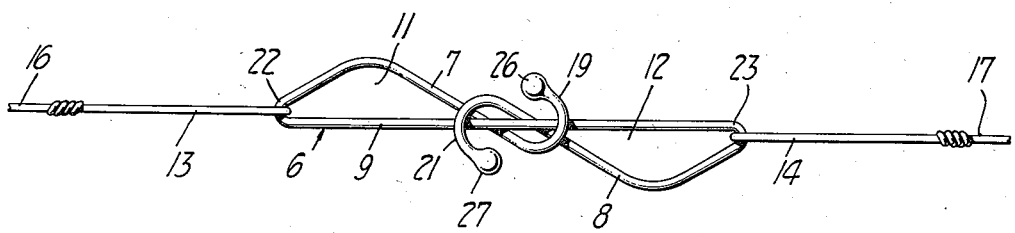
INVENTOR.
Fred Len Leon
BY Joseph B. Gardner
his ATTORNEY.

Patented Aug. 11, 1936

2,050,757

UNITED STATES PATENT OFFICE 2,050,757

COUPLING

Fred Len Leon, Richmond, Calif.

Application March 7, 1935, Serial No. 9,767

3 Claims. (Cl. 24—237)

The invention relates to devices used for connecting together lengths of line, cordage, ropes or chains or the like.

An object of the invention is to provide a coupling of the character described which will be especially adaptable for use with fishing tackle and will provide for the ready engaging and disengaging of hooks, leaders, lines and extensions or the like.

Another object of the invention is to provide a coupling of the character described which may be quickly and readily opened or closed to provide for the assembly or disassembly of lengths of line or the like without requiring the knotting and subsequent cutting usually attendant the assembly and disassembly of such lines.

A further object of the invention is to provide a coupling of the character above which will be of considerably greater strength than the lines with which it is used and yet be extremely light in weight and simple in construction.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a side view of a coupling constructed in accordance with my invention and shown in open position and operatively disposed for receiving the ends of a pair of lines.

Figure 2 is a view similar to Figure 1 but showing one side of the coupling closed and the associated line attached.

Figure 3 is a view similar to Figures 1 and 2, but showing a coupling in fully closed position.

With reference to the drawing, the coupling 6 of my invention comprises a length of resilient wire which is folded adjacent the end portions 7 and 8 to position such ends, when in open and unstressed position as shown in Figure 1, at opposite sides of and spaced from a substantially straight center or intermediate portion 9. In accordance with the present arrangement, means are provided for securing the ends of the wire to the intermediate portion 9 so as to define a pair of generally longitudinally aligned closed loops 11 and 12, as shown in Figure 3, for extending through the looped ends 13 and 14 of the lines 16 and 17 arranged to be fastened together by the coupling. As here shown, such means is comprised of curved or hook-like portions 19 and 21 provided adjacent the outer ends of the portions 7 and 8 to afford on a flexing of such portions towards the intermediate portion 9 the encircling of the portions 19 and 21 about the portion 9, and thereby secure the loops 11 and 12 in closed position.

As will be further noted from the drawing, the hooked portions 19 and 21 by reason of their opening in opposite directions, provide, when drawn into encircling relation about the intermediate portion 9 as aforesaid, for the interlocking of the hook portions with each other, as clearly shown in Figure 3. By reason of this arrangement therefore, not only is the retention of the hooks about the intermediate portion insured, but also the ends of the wire are effectively held against longitudinal separation normally prompted by a longitudinal tensile stress on the outer ends of the loops.

Preferably the intermediate portion 9 is substantially straight over its full length intermediate the outer ends 22 and 23 of the loops, so that when the coupling is subjected to a tensile stress, as indicated in Figure 3, the major portion of the stress will be carried by the center portion 9, and the curved end portions 7 and 8 will be subjected to a correspondingly less stress. As will be clear from the drawing, this arrangement of the stresses to which the coupling is normally subjected is caused by reason of the direct and substantially straight tie that the intermediate portion forms between the outer ends of the loops while the curvature of the end portions 7 and 8 serves more to secure the loops in closed position rather than resist the direct longitudinal stress to which the coupling may be subjected. To carry this feature out most effectively, it is desirable that a rather sharp curve be provided for the receipt of the line connections at the outer ends 22 and 23 of the loops, and as here shown, the end portions 7 and 8 curve rather sharply away from the intermediate portion at such ends and are then extended into a generally parallel relation with the intermediate portion to adjacent the center thereof. As a result, the tension set up by the lines 16 and 17 at the ends 22 and 23 of the coupling tends to spring the end portions 7 and 8 of the wire into a more firmly engaged position about the intermediate portion 9 rather than subject such portions to a direct longitudinal tension. However, with an increased longitudinal strain on the coupling, part of the burden from the intermediate portion 9 is automatically shifted to the end portions 7 and 8, as the loops 11 and 12 tend to elongate, and under such conditions the hook portions 19 and 21 are drawn into nested interlocking engagement with one another. It will, therefore, be clear that while normally the major portion of the stress burden is carried by the intermediate portion 9, the coupling will be fully capable of handling very considerable overloads without breaking. Where a coupling is to be used with fishing lines and the like where the load is rarely high, it will be clear that a coupling may be made unusually small and compact and still afford ample strength.

In order that the opening and closing of the coupling may be effected simply and without any possible scratching or discomfort to the fingers of the user, I prefer to form the extremities of the hook portions 19 and 21 with small beads or knobs 26 and 27 for ready grasping. With the coupling in closed position, as shown in Figure 3, it is only necessary to grasp the knobs 26 and 27 between a pair of fingers, and by imparting to the knobs a simple twisting motion, free them from the intermediate portion 9 of the coupling and allow the end portions to spring out to a spaced opened position, as shown in Figure 1. On the other hand, the closing of the coupling from an open position is most readily effected by first engaging one of the curved ends about one side of the intermediate portion, as shown in Figure 2, and then drawing the other end into encircled position about the side of the intermediate portion. Preferably the lengths of the end portions 7 and 8 are such as to provide a longitudinal clearance or spacing between the knobs 26 and 27 when the coupling is in closed position, as shown in Figure 3, so that these knobs may be moved one by the other in the opening of the device.

It will now be clear that my coupling may be used to quickly and readily connect and disconnect ends of lengths of substantially any line, cordage or ropes or the like, and that by the use of a simple loop or similar arrangement at the ends of such lines, no knotting or cutting of the lines is ever required for providing the latter's assembly or dissociation.

I claim:

1. A coupling comprising, a resilient wire defining in normal position a relative straight center portion and ends folded from said portion and returned in spaced relation thereto at opposite sides thereof, and means for securing said ends and center portion together to define a pair of substantially longitudinally aligned loops for enclosing the ends of a tension line or the like, the outer ends of said loops being directly connected by said center portion in substantially a straight line whereby on subjection of the coupling to tension the major initial stress will be carried by said center portion.

2. A coupling of the character described comprising, a length of resilient wire formed with an intermediate portion, outer portions bent from said intermediate portion and overlying the latter at opposite sides thereof, and curved ends on said outer portions arranged to hook over said intermediate portion to define a pair of longitudinally spaced loops, said outer portions being of a length relative to said intermediate portion that with said portions connected as aforesaid said ends will be engaged with a length of said intermediate portion between the adjacent inner extremities of said loops and with said ends crossed in interlocking relation with each other.

3. A coupling of the character described comprising, a length of resilient wire having an intermediate length extended through curved portions to return the outer ends of said wire into overlying relation to said intermediate length, said ends being curved and arranged to encircle said intermediate length to define a pair of longitudinally spaced loops for coupling the ends of a tension line, said curved portions joining said intermediate length and ends of the wire having their axes of curvature inclined to the direction of pull on the loops so as to direct the stress on the coupling to said intermediate length.

FRED LEN LEON.